P. A. MYERS,

Assignor of one-half to F. E. MYERS.

FORCE PUMP.

No. 10,048. Reissued Feb. 28, 1882.

Witnesses:
F. L. Middleton
Walter Donaldson

Inventor:
Philip A. Myers
By Ellis Spear
Attorney

N. PETERS, Photo-Lithographer, Washington, D. C.

UNITED STATES PATENT OFFICE.

PHILIP A. MYERS, OF ASHLAND, OHIO, ASSIGNOR OF ONE-HALF TO F. E. MYERS, OF SAME PLACE.

FORCE-PUMP.

SPECIFICATION forming part of Reissued Letters Patent No. 10,048, dated February 28, 1882.

Original No. 228,103, dated May 25, 1880. Application for reissue filed December 22, 1881.

*To all whom it may concern:*

Be it known that I, PHILIP A. MYERS, of Ashland, county of Ashland, State of Ohio, have invented a new and useful Improvement in Force-Pumps; and I hereby declare that the following is a full, clear, and exact description thereof.

My invention relates to force pumps, and is designed to secure a steady flow of water by a simple and cheap construction of the pump.

The special improvements are described hereinafter in connection with old parts, and are particularly indicated in the claims.

The special construction in which my invention is embodied is shown in the accompanying drawings, in which—

Figure 1:
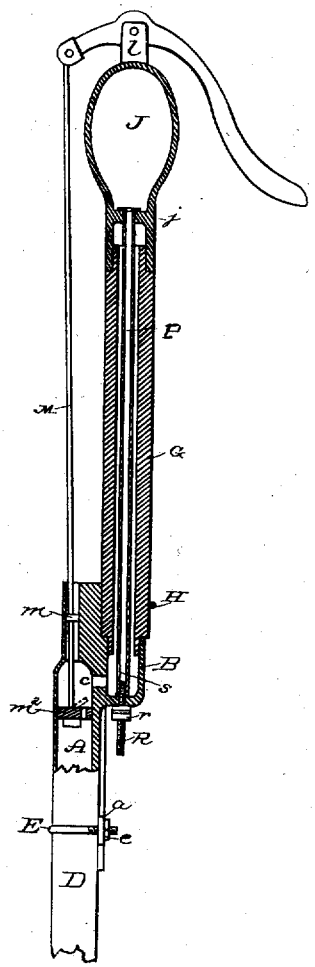
Figure 2:
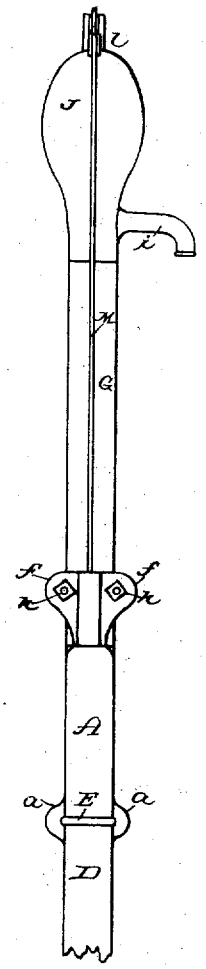

Figure 1 represents a central vertical section of the pump; and Fig. 2, a side elevation of the same, one-quarter turned.

In the drawings, the pump-cylinder is represented at A, partly broken away to show the interior in section. It is made with a larger and smaller bore, both in the same axial line, in which bores work two corresponding pistons, $m$ $m^2$, on the same rod, M. The cylinder A is made of metal, and is cast in one piece with a lateral extension, B, with the interior of which it communicates through a port, $c$, arranged between the limit of motion of the two pistons.

The suction-pipe may be made of wood, and is inserted in the lower end of the cylinder A, to which it is connected by means of a staple, E, surrounding the pipe D, and passing through lugs $a$ $a$ on a plate formed with the cylinder, and secured by nuts $e$.

The bore or cavity of the side extension, B, is shown clearly in Fig. 1. Into the top of this is inserted the discharge-pipe G. This is made of wood, and secured in place by means of a staple, H, surrounding it and passing through lugs $f$ $f$ on the upper part of the cylinder A, where it is held by nuts $h$. The discharge-pipe is bored out longitudinally, as shown in Fig. 1, large enough to secure a pipe, P, and leave an annular space around said pipe for the passage of the water. This annular passage terminates in an enlarged annular space below and in another enlarged annular space above, the latter being just below a transverse diaphragm, $j$, through which the pipe P passes and in which it is held. This pipe is shown as opening into an air-chamber, J, surmounting the discharge-pipe G; but the diaphragm $j$ closes the water-passage in that direction. There is an opening or port, $s$, in the lower end of the air-pipe P, nearly opposite the port $c$, and free communication for the water from the cylinder A up the discharge pipe and out at the spout $i$.

The pipe P is of metal, having its upper end flanged to rest on the diaphragm $j$. Its lower end has a screw-bolt attached to it, (marked R,) which passes through the bottom of the extension B, and is fastened by a nut, $r$, thus securing the parts together. As the pipe P is closed to the water except at the port $s$, when water is forced into the lower annular chamber about said pipe it can enter this pipe P only by compressing the air within the pipe and the connected chamber. The amount of compression will manifestly depend upon the pressure of the water at the ports in the annular passage about the pipe P, but is constantly against the water so long as there is any remaining about the port $s$.

The diaphragm $j$ prevents the water from rising upward, and forces it out directly to the spout.

The air-chamber is of cast-iron and forms an extension of the discharge-pipe, and on it is pivoted the handle, to which is attached the rod M.

The diaphragm $j$ is of special importance as serving to prevent the rise of water.

What I claim as my invention, and desire to secure by Letters Patent of the United States, is—

1. The combination, with the discharge-pipe of a pump, of an air-tube fixed within said pipe and open to the water at the bottom, whereby the water, when forced up said discharge-pipe, is reacted upon by the compressed air in the air-pipe, substantially as described.

2. The combination of the discharge-pipe connected to the pump, as described, with the air-pipe located therein and open to the water at the lower part, and with the diaphragm $j$ and air-chamber J, all the parts being adapted to operate in the pump substantially as described.

PHILIP A. MYERS.

Witnesses:

FRANK L. MIDDLETON,

WALTER DONALDSON.